(12) United States Patent
Dick

(10) Patent No.: US 9,503,301 B2
(45) Date of Patent: Nov. 22, 2016

(54) NOISE-SHAPING CREST FACTOR REDUCTION WITH POLYPHASE TRANSFORMING

(71) Applicant: Xilinx, Inc., San Jose, CA (US)

(72) Inventor: Christopher H. Dick, San Jose, CA (US)

(73) Assignee: XILINX, INC., San Jose, CA (US)

( * ) Notice: Subject to any disclaimer, the term of this patent is extended or adjusted under 35 U.S.C. 154(b) by 72 days.

(21) Appl. No.: 14/662,099

(22) Filed: Mar. 18, 2015

(65) Prior Publication Data

US 2016/0277229 A1 Sep. 22, 2016

(51) Int. Cl.
*H04J 3/02* (2006.01)
*H04L 27/26* (2006.01)
*H04L 1/00* (2006.01)

(52) U.S. Cl.
CPC ......... *H04L 27/2623* (2013.01); *H04L 1/0009* (2013.01); *H04L 27/2631* (2013.01)

(58) Field of Classification Search
None
See application file for complete search history.

(56) References Cited

U.S. PATENT DOCUMENTS

2002/0101935 A1* 8/2002 Wright .............. H04L 25/03834
375/295
2011/0009153 A1* 1/2011 Chiba .................. H04B 1/0475
455/522

OTHER PUBLICATIONS

De Leon, Philip L., "On the Use of Filter Banks for Parallel Digital Signal Processing", $7^{th}$ NASA Symposium on VLSI Design 1998, Oct 1998, pp. 1-9, Albuquerque, New Mexico.
Gockler, Heinz G., "Polyphase Realisation of Fractional Sample Rate Converters", Digital Signal Processing Group, Ruhr-Universitat Bochum, D-44780 Bochum, Germany, pp. 1-4, provided Mar. 18, 2015.
Lashkarian, Navid et al., "Reconfigurable Digital Front-End Hardware for Wireless Base-Station Transmitters: Analysis, Design and FPGA Implementation", IEEE Transactions on Circuits and Systems I: Regular Papers, vol. 54, issue 8, Aug. 2007, pp. 1666-1677, IEEE, Piscataway, New Jersey, USA.
Vecima, Wideband Networking Waveform OFDM PHY, Physical Layer Implementation of WNW on the SDR-4000 Platform Spectrum Signal Processing, pp. 1-4, provided Mar. 18, 2015.
U.S. Appl. No. 14/088,221, filed Nov. 22, 2013, Copeland, Gregory C.

* cited by examiner

*Primary Examiner* — Minh-Trang Nguyen
(74) *Attorney, Agent, or Firm* — W. Eric Webostad

(57) ABSTRACT

Apparatus, system and method relates generally to data communication with noise-shaping crest factor reduction using polyphase transformation. In such a method, a composite signal is received by a delay and a waveform generator. The waveform generator is for noise-shaping crest factor reduction using polyphase transformation. The composite signal is delayed by the delay to provide a delayed composite signal. A waveform is generated by the waveform generator from the composite signal. The waveform is output from the waveform generator having clipping noise with respect to bands of corresponding carriers of the composite signal. The waveform is subtracted from the delayed version of the composite signal for peak-to-amplitude power ratio reduction. A reduced peak version of the delayed version of the composite signal delayed is output from the signal combiner.

20 Claims, 8 Drawing Sheets

NOISE-SHAPING CREST FACTOR REDUCTION WITH POLYPHASE TRANSFORMING

FIELD OF THE INVENTION

The following description relates to integrated circuit devices ("ICs"). More particularly, the following description relates to noise-shaping crest factor reduction by use of polyphase transforming for an IC.

BACKGROUND

With respect to peak-to-average power ratio ("PAPR"), a PAPR reduced signal permits a power amplifier input back-off to be reduced, which in turn increases the efficiency of an amplification process. Moreover, a power amplifier input bias set point may be set to operate with higher efficiency for a PAPR reduced signal input for transmission. However, in the past, circuitry used to provide a PAPR reduced signal used a significant amount of circuit complexity for channelization and recombination. Along those lines, generally in the past each channel had a digital down converter and a digital up converter, including multipliers among other circuitry associated therewith, for a noise-shaping crest factor reduction ("NS-CFR") path for providing an error signal for PAPR reduction. If there were N channels or N carriers in a composite signal, then there were N instances of such conventional NS-CFR paths. Hence, it is desirable and useful to provide an IC having reduced complexity for providing a NS-CFR path.

SUMMARY

An apparatus relates generally to data communication. In such an apparatus, a delay is coupled to receive a composite signal having multiple carriers to provide a delayed version of the composite signal. A waveform generator is coupled to receive the composite signal to provide a waveform. The waveform generator is coupled for noise-shaping crest factor reduction. A signal combiner is coupled to the delay to receive the delayed version of the composite signal and coupled to the waveform generator to receive the waveform. The signal combiner is coupled to reduce at least one peak in the delayed version of the composite signal by application of the waveform to the delayed version of the composite signal for peak-to-average power ratio reduction thereof. The waveform generator includes: a threshold and clip block, a polyphase transform block, a filter block, and an inverse polyphase transform block. The threshold and clip block is coupled to receive the composite signal to provide clipping noise with the composite signal. The polyphase transform block is coupled to convert the clipping noise with the composite signal to first spectrally translated components channelized for channels corresponding to the multiple carriers. The filter block is coupled to receive the first spectrally translated components to provide filtered components corresponding to the first spectrally translated components for removing therefrom original components of the composite signal, as well as some in-band and out-of-band distortion. The inverse polyphase transform block is coupled to receive the filtered components to provide second spectrally translated components for composition as the waveform.

A system relates generally to data communication. In such a system, there is a multi-radio base station and mobile devices in communication with the base station. The mobile devices use a different communication protocols for the data communication. The multi-radio base station includes a PAPR device. The PAPR device includes a delay, a waveform generator, and a signal combiner. The delay is coupled to receive a composite signal having multiple carriers for the different communication protocols to provide a delayed version of the composite signal. The waveform generator is coupled to receive the composite signal to provide a waveform. The waveform generator is for noise-shaping crest factor reduction using polyphase transformation. The signal combiner is coupled to the delay to receive the delayed version of the composite signal and coupled to the waveform generator to receive the waveform. The signal combiner is coupled to reduce at least one peak in the delayed version of the composite signal by application of the waveform to the delayed version of the composite signal for peak-to-average power ratio reduction thereof.

A method relates generally to data communication. In such a method, a composite signal is received by a delay and a waveform generator. The waveform generator is for noise-shaping crest factor reduction using polyphase transformation. The composite signal is delayed by the delay to provide a delayed composite signal. A waveform is generated by the waveform generator from the composite signal. The waveform is output from the waveform generator having clipping noise with respect to bands of corresponding carriers of the composite signal. The waveform is subtracted from the delayed version of the composite signal for peak-to-amplitude power ratio reduction. A reduced peak version of the delayed version of the composite signal delayed is output from the signal combiner.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
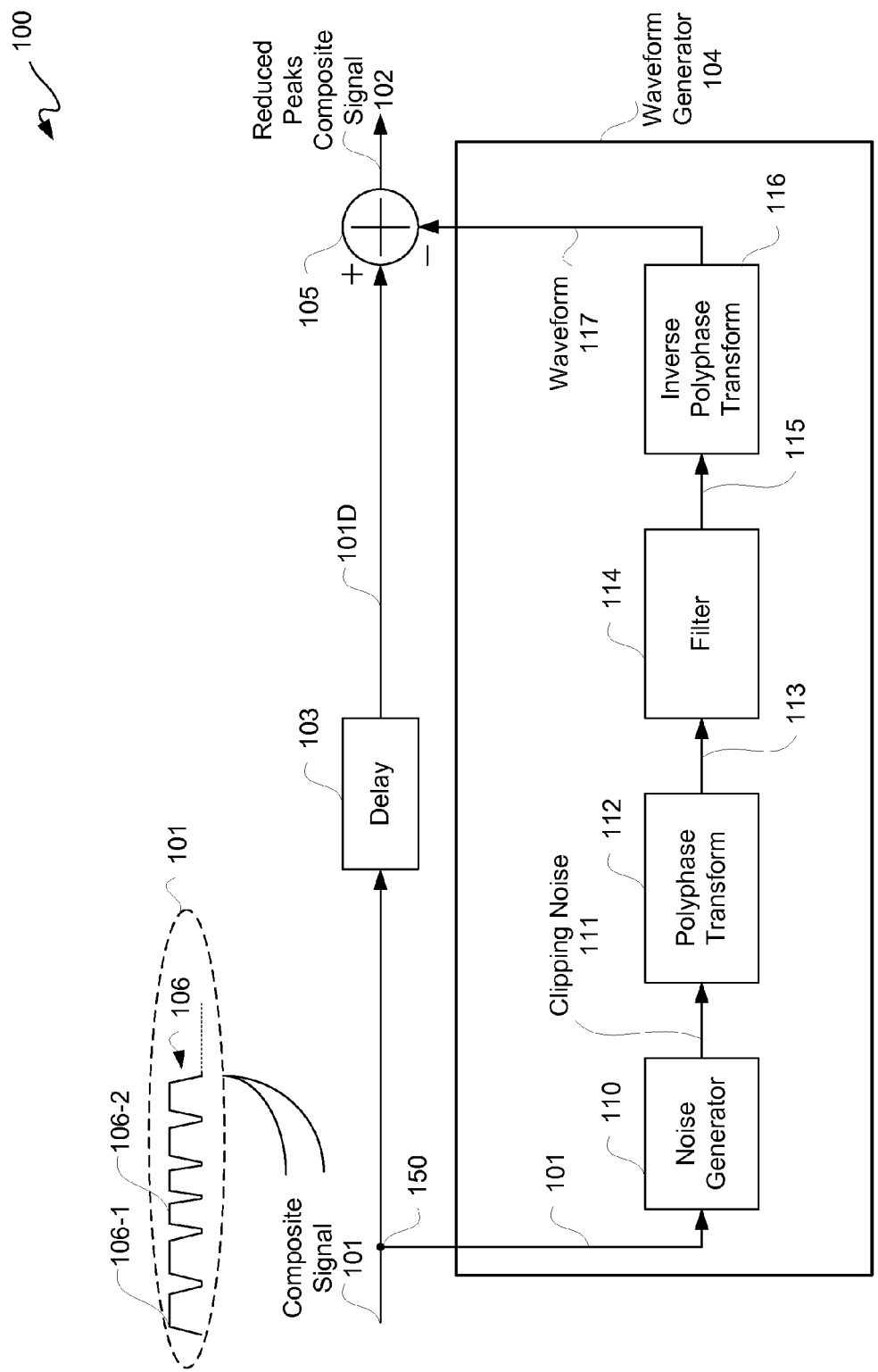
FIG. 1 is a block diagram depicting an exemplary peak-to-average power ratio ("PAPR") device.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

As is known, it is desirable to reduce, including without limitation reduce, including without limitation minimize, the ratio of a peak of an RF envelope to an average of a corresponding RF signal. Such reduction may be carried out with a degree of control of an amount of in-band distortion generated. This in-band distortion is corruptive with respect to a modulation waveform, or more generally quality of a transmission. Along those lines, peak-to-average power ratio ("PAPR") reduction is described in additional detail in "Reconfigurable Digital Front-End Hardware for Wireless Base-Station Transmitters: Analysis, Design and FPGA Implementation" by Navid Lashkarian, et al., published in IEEE Transactions on Circuits and Systems I: Regular Papers (volume 54, issue 8) in August 2007 at pages 1666-1677 (hereinafter "the Paper"). In the Paper, noise shaping crest factor reduction ("CFR") is disclosed. Additionally, a clipping noise generator is described in the Paper; however, other forms of clipping noise generators may be used in accordance with the following description.

As described below in additional detail, clipping noise is generated for a composite signal. This clipping noise along with such composite signal is decomposed into channels with a polyphase transform, and original components of such composite signal may be filtered out on a carrier-by-carrier or channel-by-channel basis leaving channelized clipping noise components or spectra for each carrier, as well as possibly some in-band and/or out-of-band distortion introduced by generation of such clipping noise. This distortion may likewise be filtered out along with original components of such composite signal with a channelized filter. Such channelized clipping noise components may be composed into a PAPR reducing waveform with an inverse polyphase transform for combination. Such recomposed signal may be combined with such composite signal to have a PAPR reduced composite signal for transmission. This is significant as the number of multipliers used in providing noise-shaping CFR ("NS-CFR") as described herein is substantially less than in a convention NS-CFR path. Moreover, as the number of carriers and/or antennas used increases, such reduction in multiplier count becomes more dramatic.

With the above general understanding borne in mind, various configurations for PAPR reduction are generally described below.

FIG. 1 is a block diagram depicting an exemplary PAPR device 100. PAPR device 100 may include a delay 103, a signal combiner 105, and a waveform generator 104. Waveform generator 104 may be considered a NS-CFR device 104. In other words, waveform generator 104 may be configured for NS-CFR, as described below in additional detail.

Delay 103 and waveform generator 104 may be commonly coupled at an input node 150 to receive a composite signal 101. Composite signal 101 may have multiple carriers 106. Composite signal 101, delayed composite signal 101D, reduced peaks composite signal 102, and waveform 117 may all be digital signals in a frequency domain. As described below in additional detail, reduced peaks composite signal 102 may generally be thought of as a version of composite signal 101 with a reduced PAPR though possibly with more in-band and/or out-of-band distortion due to such PAPR reduction, where any such added in-band and/or out-of-band distortion may be controllably limited as described below.

Delay 103 may output a delayed version or copy of composite signal 101, namely delayed composite signal 101D. Delay 103 may provide a delay to match a delay of signal propagation from input node 150 through waveform generator 104 to signal combiner 105. Along those lines, delayed composite signal 101D and a waveform 117 corresponding thereto for a same composite signal 101 as delayed composite signal 101D may both arrive at signal combiner 105 generally at a same time for subtraction of waveform 117 from delayed composite signal 101D corresponding thereto.

Composite signal 101 may include two or more carriers 106, namely a composite signal $x_n$ for n a number of carriers. Such carriers may all be of a same type, or carriers may be a mixture of carriers. Examples of carrier signal formats or protocols that may be used include LTE, WCDMA, and CDMA200, among others. Some examples of carriers include LTE 5, 10, 15, 20 MHz carriers, 5 MHz WCDMA carriers, among others. Accordingly, a sampling rate for composite signal 101 depends on composition of composite signal 101. Effectively composite signal 101 may be considered a wideband waveform with spectral portions thereof associated with input component carriers.

Again, waveform generator 104 may be commonly coupled to input node 150 to receive composite signal 101 to provide an output waveform 117 from waveform generator 104. Signal combiner 105 may be coupled at a positive input port thereof to an output of delay 103 to receive delayed composite signal 101D, and signal combiner 105 may be coupled at a negative input port thereof to an output port of waveform generator 104 to receive waveform 117. By effectively subtracting waveform 117 from delayed composite signal 101D, output of signal combiner 105 may be coupled to reduce at least one peak in such delayed composite signal 101 by application of waveform 117 to delayed composite signal 101D. Accordingly, a composite signal 102 output from signal combiner 105 may have reduced peaks in comparison to composite signal 101 corresponding thereto. Along those lines, composite signal 102 may have in-band and/or out-of-band distortion limited for a communication protocol and/or a channel specified limit after PAPR provided by PAPR device 100.

Waveform generator 104 may include a threshold and clip block 110, a polyphase transform block 112, a filter block 114, and an inverse polyphase transform block 116 coupled in series to provide waveform 117, namely a PAPR reducing signal 117.

Threshold and clip block 110 receives a composite 101 from input node 150, and threshold and clip block 110 may be configured to provide clipping noise 111 as an output therefrom. Clipping noise 111 output is a digital output in a frequency domain. As described below in additional detail, threshold and clip block 110 may be coupled to receive composite signal 101 to provide clipping noise components for PAPR reduction in such composite signal 101.

A clipping noise generator as described in the Paper may be used for threshold and clip block 110, or some other form of clipping noise generator may be used in accordance with the description herein. Sometimes this form of clipping is termed a "soft clipping of peaks," so as to reduce in-band and out-of-band noise generated in comparison with a hard clipping of peaks. In other configurations, other types of non-linear noise generators may be used provided in-band and out-of-band noise generation is not unduly excessive.

Polyphase transform block 112 may be coupled to receive clipping noise 111 from threshold and clip block 110. Polyphase transform block 112 may convert, namely polyphase transform, such clipping noise 111 to first spectrally translated components 113 of such clipping noise channelized corresponding to channels of carriers 106. Along those lines, considering composite signal 101 as a wideband signal with spectral portions associated with carriers thereof, clipping noise 111 may be associated with such spectral portions. In other words, clipping noise 111 may have contributions, namely in-band and out-of-band noise, associated with carriers 106 composing composite signal 101. Thus, such first spectrally translated components 113 may be associated with carriers 106 of composite signal 101. Filter block 114 may be coupled to polyphase transform block 112 to receive first spectrally translated components 113.

Filter block 114 may filter such first spectrally translated components 113 to provide filtered components 115 corresponding to such first spectrally translated components 113 received. Inverse polyphase transform block 116 may be coupled to filter block 114 to receive such filtered components 115. Both polyphase transform block 112 and inverse polyphase transform block 116 may be configured to process multi-frequency division multiplexed signals, as described below in additional detail.

Inverse polyphase transform block 116 may convert, namely inversely polyphase transform, such filtered components 115 to provide second spectrally translated components 404 of FIG. 4, as described below in additional detail, which may be commutated by a commutator of inverse polyphase transform block 116 to provide waveform 117. Effectively, waveform 117 may generally be a channel-by-channel composition of clipping noise contributions for corresponding carriers 106 of composite signal 101.

Waveform 117 may have removed, such as by channel filtering with channelized filter 114, therefrom original components of composite signal 101, effectively leaving substantially only commutated clipping noise contributions corresponding to carriers 106, namely corresponding to channel bands of such carriers, of composite signal 101, as well as possibly limited amounts of in-band and/or out-of-band distortion generated by threshold and clip block 110 not filtered out by such channel filtering.

Figure 2A:
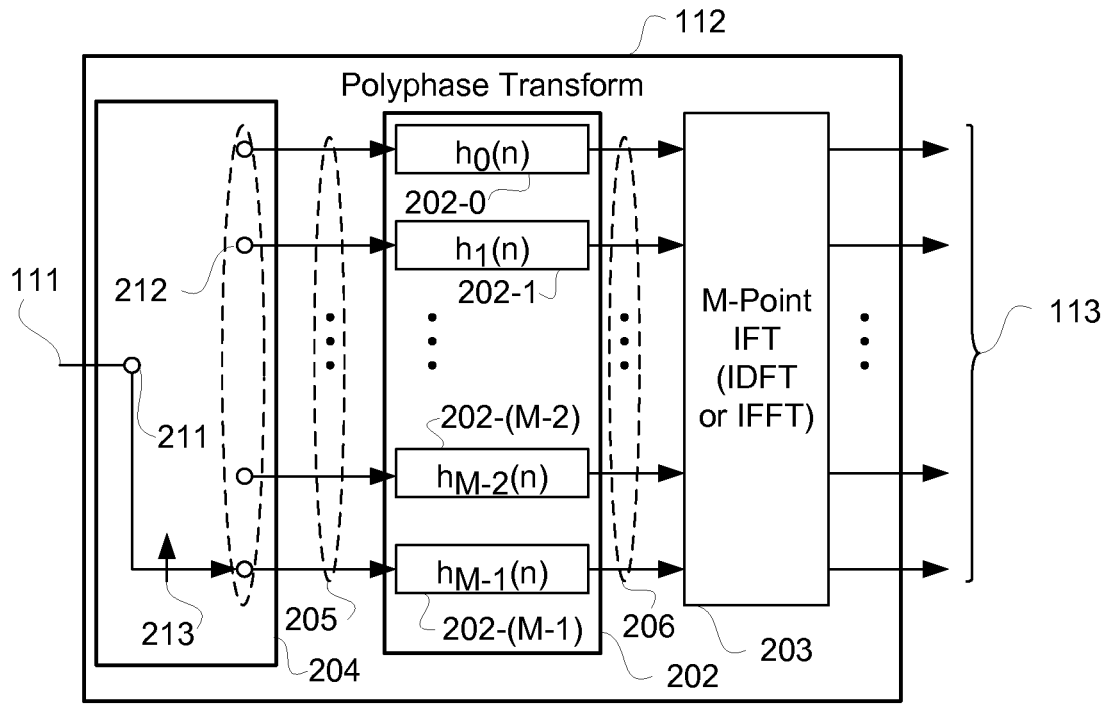
FIG. 2A is a block diagram depicting an exemplary polyphase transform block.

FIG. 2A is a block diagram depicting an exemplary polyphase transform block 112. Polyphase transform block 112 includes a commutator 204, polyphase filters 202, and an Inverse Fourier Transform block ("IFT") 203.

Clipping noise 111 may be received by commutator 204 at a common input port or node 211 of commutator 204. Commutator 204 may include M output ports 212, for M a positive integer. Clipping noise 111 sourced from input port 211 may be respectively commutated, as generally indicated by arrow 213, to each of output ports 212 for input to M polyphase filters of polyphase filter bank 202. Commutator 204 may be for carrier configurations where all carrier signals, or carrier bands of carrier signal configuration, are equally spaced apart from one another. Along those lines, such a carrier signal configuration may have a significant amount of structure in a carrier line-up or carrier floorplan thereof for purposes of such commutation. Known details regarding commutator 204 are not described herein for purposes of clarity and not limitation. The value of M at a minimum may be the number of distinct carriers 106 in composite signal 101.

Figure 3A:
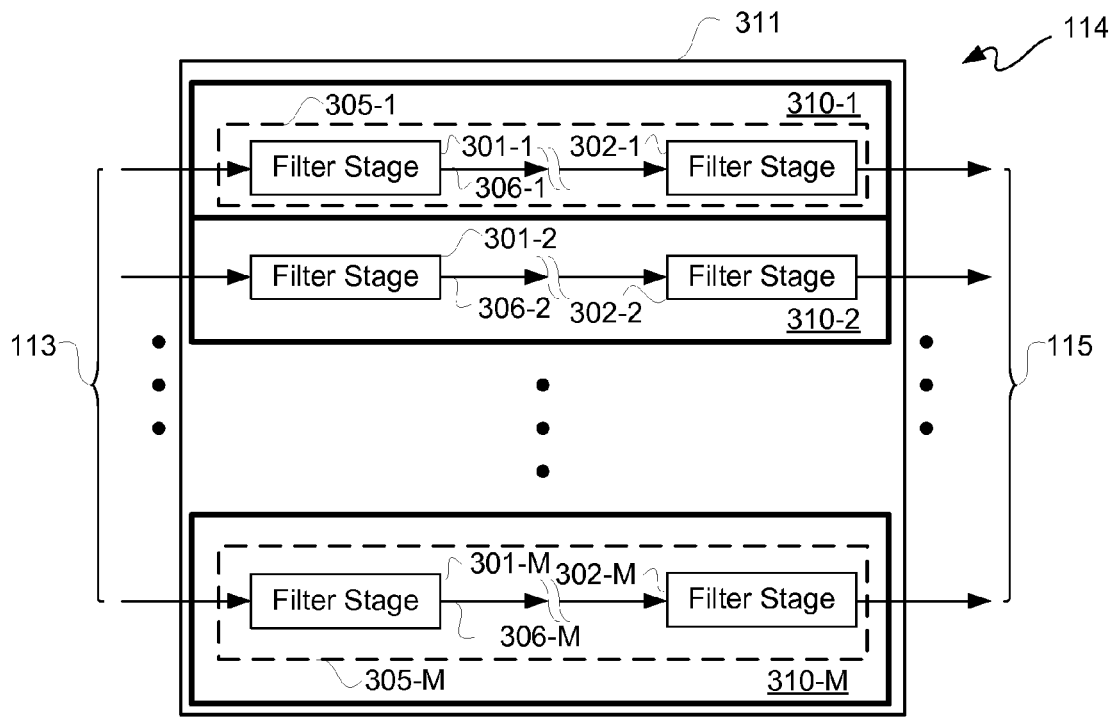
FIG. 3A is a block diagram depicting an exemplary filter block.

Effectively, commutator 204 may channelize noise components 205 of clipping noise 111 for each channel 305 of FIG. 3A corresponding to multiple carriers 106 of composite signal 101. Along those lines, outputs ports 212 may be respectively coupled to polyphase filters $h_0(n)$ 202-0 through $h_{M-1}(n)$ 202-(M-1) of polyphase filter bank 202. Polyphase filters $h_0(n)$ 202-0 through $h_{M-1}(n)$ 202-(M-1) may respectively be coupled to receive channelized noise components 205 from commutator 204 to provide corresponding decomposed components 206 respectively output from polyphase filters $h_0(n)$ 202-0 through $h_{M-1}(n)$ 202-(M-1).

An IFT 203, which may be for an IDFT or an IFFT, may be coupled to receive decomposed components 206 as an M-point frequency domain input to transform such decomposed components 206 from a digital frequency domain into a digital M-point time domain output, namely as first spectrally translated components 113. An IFT, and/or a downstream Fourier Transform block ("FT"), may be for every point size to be used, and thus is not limited to powers of two or to number of carriers 106. Along those lines, the number of carriers 106 of composite signal 101 may be equivalent to the number of points of IFT and/or such a downstream FT.

Again, output of IFT 203 is a digital output. Polyphase transform block 112 receives a digital input as clipping noise 111 and provides a digital output as first spectrally translated components 113. Polyphase transform block 112 effectively may be thought of as a baseband polyphase filter, or decimator, with an IDFT, the latter of which may be implemented in a cost effective manner as an IFFT.

Figure 2B:
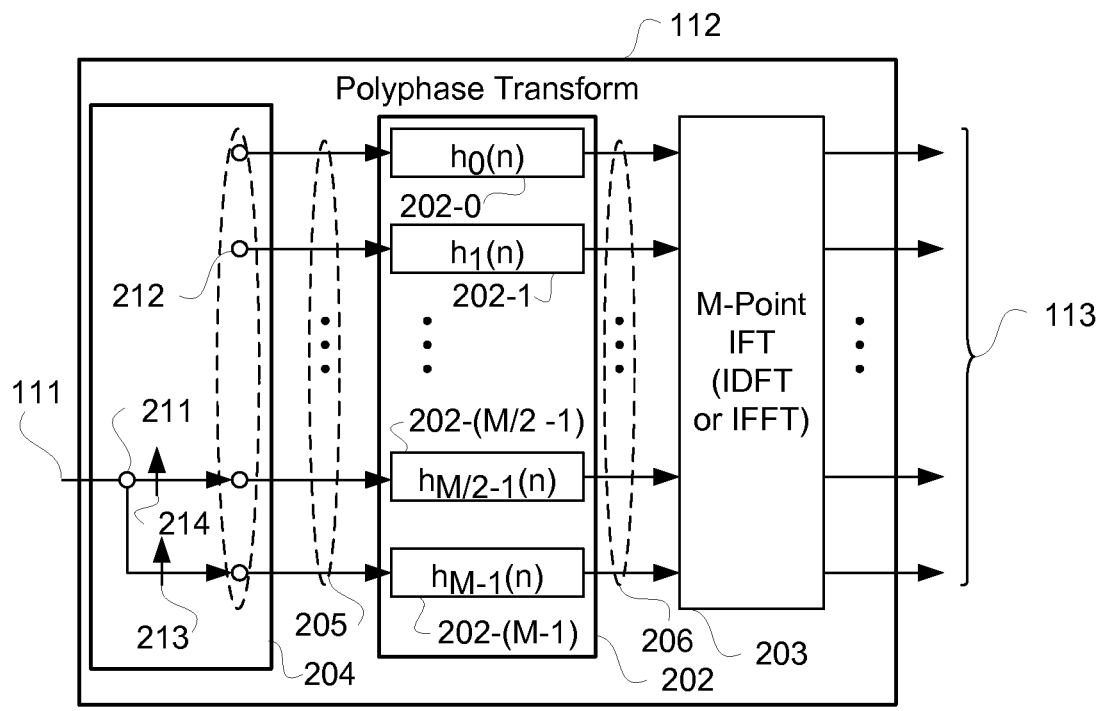
FIG. 2B is a block diagram depicting another exemplary polyphase transform block.

FIG. 2B is a block diagram depicting another exemplary polyphase transform block 112. Polyphase transform block 112 of FIGS. 2A and 2B are the same, except in the example implementation of FIG. 2B, polyphase transform block 112 has a different configuration of commutator 204 and a different configuration of polyphase filter bank 202.

Clipping noise 111 may be received by commutator 204 at a common input port or node 211 of commutator 204. Commutator 204 may include M output ports 212, for M a positive integer. Clipping noise 111 sourced from input port 211 may be respectively commutated, as generally indicated by arrows 213 and 214, to each adjacent pair of output ports 212 for input to M polyphase filters of polyphase filter bank 202. Commutator 204 may be for carrier configurations where all carrier signals, or carrier bands of carrier signal configuration, are not equally spaced apart from one another. Along those lines, such a carrier signal configuration may have carrier bands which can be arbitrarily positioned in frequency. Furthermore, such a carrier signal configuration may have same or different bandwidths. Known details regarding commutator 204 are not described herein for purposes of clarity and not limitation. The value of M at a minimum may be the number of distinct carriers 106 in composite signal 101. In this example, commutator 204 may be for a non-maximally decimated polyphase filter bank 202.

Effectively, commutator 204 may channelize noise components 205 of clipping noise 111 for each channel 305 of FIG. 3A corresponding to multiple carriers 106 of composite signal 101. Along those lines, outputs ports 212 may be respectively coupled to polyphase filters $h_0(n)$ 202-0 through $h_{M-1}(n)$ 202-(M-1) of polyphase filter bank 202. Polyphase filters $h_0(n)$ 202-0 through $h_{M-1}(n)$ 202-(M-1) may respectively be coupled to receive channelized noise components 205 from commutator 204 to provide corresponding decomposed components 206 respectively output from polyphase filters $h_0(n)$ 202-0 through $h_{M-1}(n)$ 202-(M-1). However, in this example, polyphase filters 202 may have more refined steps to provide more frequency and/or bandwidth adaptive capability for a less predictable or predefined structure. Along those lines, polyphase filters $h_0(n)$ 202-0 through $h_{M-1}(n)$ 202-(M-1) may include half increments of polyphase filters, such as polyphase filter $h_{M/2-1}(n)$ 202-(M/2-1) for example paired with polyphase filter $h_{M-1}(n)$ 202-(M-1).

To recapitulate, polyphase transformer block 112 may be coupled to channelize noise components, to respectively polyphase filter with polyphase filters such channelized noise components, and to spectrally transform such filtered-channelized noise components into a time domain for each of band of corresponding carriers.

FIG. 3A is a block diagram depicting an exemplary filter block 114. Filter block 114 may be a channelized filter 114. Channelized filter 114 may include a bank of filters 311, wherein each filter 310-1 through 310-M of such bank of filters 311 includes at least one filter stage 301 for each channel 305 of channelized filter 114. In an implementation with only "one filter stage 301" for each channel 305, such "one filter stage 301" may be considered a filter 301. However, for purposes of clarity by way of example, it shall be assumed for this filter block 114 more than one filter stage is used for each channel filter.

Channelized first spectrally translated components 113 digitally output in parallel from IFT 203 may respectively be provided to channelized filter stages 301-1 through 301-M of channelized filter 114 for corresponding channels 305-1 through 305-M. Along those lines, for carriers 106 of composite signal 101, such carriers may have corresponding channel bandwidths. Original signal in such carries 106 may generally be removed for each corresponding channel band by corresponding channelized multi-stage filters 310-1 through 310-M.

First filtered outputs 306-1 through 306-M respectively from channelized filter stages 301-1 through 301-M may respectively be input to serially coupled channelized filter stages 302-1 through 302-M of channelized filter 114 for corresponding channels 305-1 through 305-M. Even though each filter 310 for channels 305-1 through 305-M is illustratively depicted as having two filter stages coupled in series, more than two filter stages may be coupled in series for each of channels 305-1 through 305-M in other implementations.

Channelized filtered components 115 may be respectively output from each final filter stage, namely channelized filter stages 302-1 through 302-M in this example. Channelized filter stages of filter block 114 may be used to remove original spectral components of composite signal 101, namely carrier components 106 of composite signal 101 prior to clipping noise generation. Accordingly, digital channelized filtered components 115 output by filter block 114 may be associated with spectral components of clipping noise 111 in association with corresponding carriers 106. The number of channels M may accordingly depend upon the number of channels used by carriers 106 of composite signal 101.

Figure 3B:
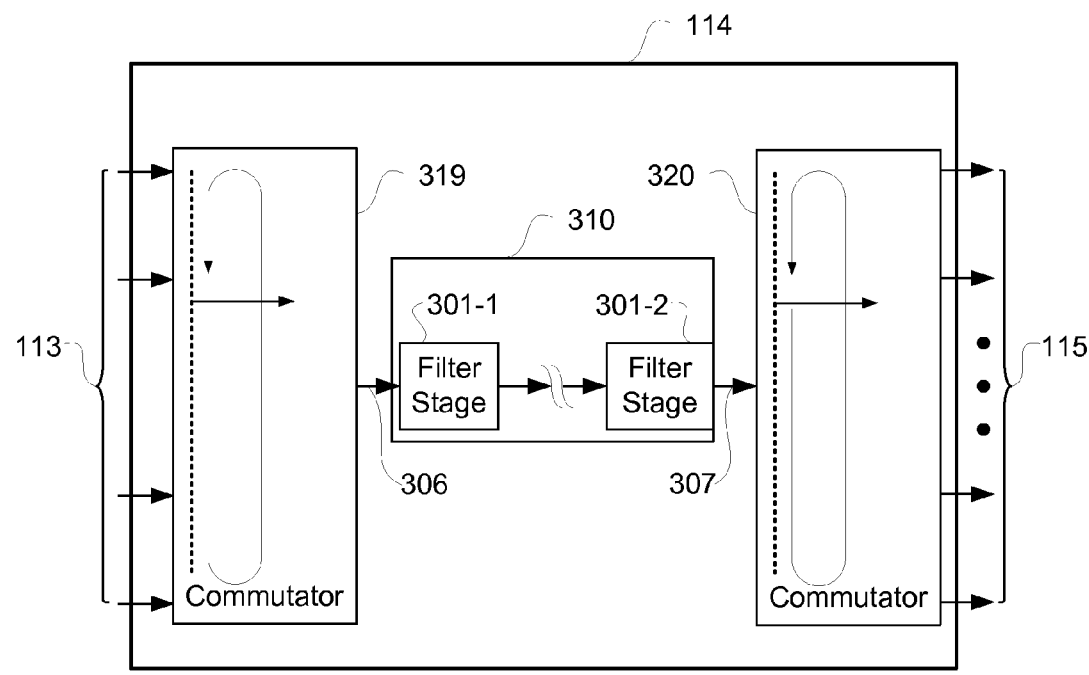
FIG. 3B is a block diagram depicting another exemplary filter block.

FIG. 3B is a block diagram depicting another exemplary filter block 114. Filter block 114 may be a channelized filter 114. Channelized filter 114 may include at least one filter stage 301-1 of a filter 310. In an implementation with only "one filter stage 301", such "one filter stage 301" may be considered a filter 310. Thus, a filter 310 of channelized filter 114 may include a plurality of filter stages, such as filter stages 301-1 and 301-2 coupled in series, or a single filter stage 301. Again, even though two filter stages 301 are illustratively depicted, in other implementations more than two filter stages 301 may be coupled in series.

Channelized filter 114 of FIG. 3B includes an input commutator 319 and an output commutator 320. Input commutator 319 may be coupled to receive first spectrally translated components 113 from filter block 114 to cycle through each thereof on a channel-by-channel basis to provide each as a single filter input 306 to filter 310 to provide a single filter output 307 from filter 310. For a multiple stage filter 310, single filter input 306 may be input to filter stage 301-1 and output of filter state 301-1 may be input to serially coupled filter stage 301-2, and output of filter state 301-2 may be single filter output 307.

Single filter output 307 may be provided as an input to an output port of commutator 320 coupled to receive single filter output 307 from the filter 310 to provide filtered components 115 for each channel 305 of channelized filter 114. Output commutator 320 may be synchronized with input commutator 319 to cycle through each channel on a channel-by-channel basis to receive each single filter output 307 to provide filtered components 115 for each channel 305 of channelized filter 114. It should be appreciated that filtered components 115 may be channelized clipping noise spectra in a digital time domain.

To recapitulate, a channelized filter may be coupled to filter filtered-channelized noise components in a digital time domain for each channel of corresponding carriers to controllably limit in-band distortion and/or to controllably limit out-of-band distortion for each band of such carriers of a composite signal to provide channelized filtered noise components. For example, suppose composite signal or waveform 101 after passing through threshold and clip block 110 has a first amount of in-band distortion and a first amount of out-of-band distortion for a carrier 106-1 of FIG. 1, and has a second amount of in-band distortion and a second amount of out-of-band distortion for a carrier 106-2. Channelized filter 114 by configuring filters 310 differently from one another may be configured to controllably limit such first amount of in-band distortion, such first amount of out-of-band distortion, such second amount of in-band distortion, and such second amount of out-of-band distortion differently for such first carrier 106-1 than for such second carrier 106-2. These amounts of distortions may be different from one another. Moreover, a specified in-band distortion limit for carrier 106-1 may be different than a specified in-band distortion limit for carrier 106-2, and likewise for out-of-band distortion limits.

Figure 4:
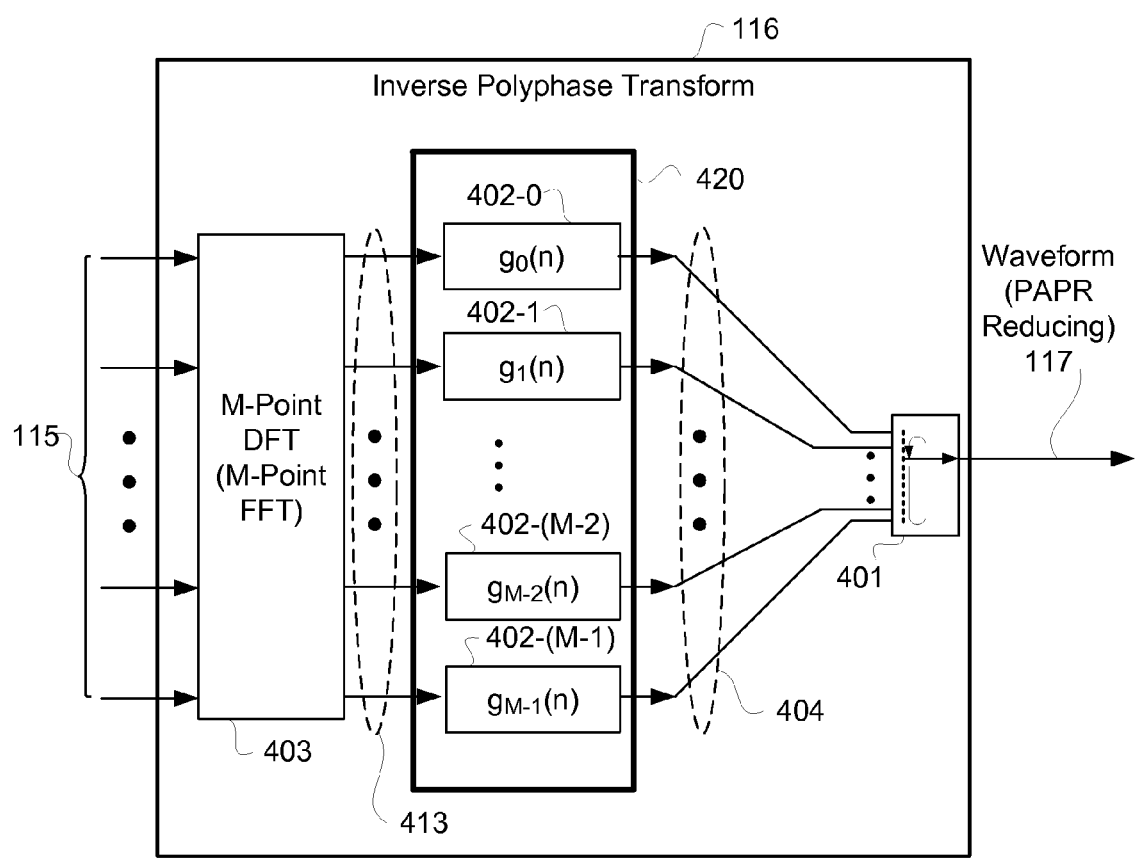
FIG. 4 is a block diagram depicting an exemplary inverse polyphase transform block.

FIG. 4 is a block diagram depicting an exemplary inverse polyphase transform block 116. Inverse polyphase transform block 116 includes a Fourier Transform ("FT") 403, a bank of polyphase filters 420, and an output commutator 401.

FT 403 may be coupled to receive channelized digital time domain filtered components 115 as an M-point input to transform such filtered components 115 into an M-point frequency domain output 413. Such M-point frequency domain output 413 may respectively be input to polyphase filters 402-0 through 402-(M-1) of polyphase filter bank 420. Outputs of polyphase filters 402-0 through 402-(M-1) of polyphase filter bank 420 may be second spectrally translated components 404. Second spectrally translated components 404 may be channelized corresponding to channels 305 of multiple carriers 106 of composite signal 101. Thus, inverse polyphase transform block 116 may be coupled to spectrally transform channelized filtered noise components into a frequency domain to provide an M-point output vector that is presented to an M-input interface of an M-path polyphase filter bank 420 with polyphase filters 402 to provide an M-point channelized output as second spectrally translated components 404.

An output commutator 401 may be coupled to deliver samples from each of such filter segments of second spectrally translated components 404, such as starting from an output of polyphase filter 402-0 and sequentially proceeding to an output of polyphase filter 402-(M-1), and then wrap around at the bottom and begin again at the top, namely begin again at an output of polyphase filter 402-0. Thus, output commutator 401 may cycle through each channel of channels 305 to sequentially provide outputs of second spectrally translated components 404 to provide a composite waveform 117 of clipping noise components corresponding to carriers 106 of delayed composite signal 101D for channel-by-channel combination therewith. In other words, a PAPR reducing waveform 117 is a channel-by-channel, and then a repeat thereof, composition of noise clipping components respectively associated with carriers 106 of delayed composite signal 101D. These noise clipping components may include some in-band distortion and/or some out-of-band distortion respectively associated with carriers 106; however, such in-band and out-of-band distortion may be controlled, namely limited, by configuration of polyphase filters of polyphase filter banks 202 and/or 420 on a per channel basis, where each such channel may be associated with a communication protocol and/or a carrier specific limit for either or both of such types of distortion. Thus, in-band and/or out-of-band distortion for each carrier band of carriers 106 may be controlled on a channel-by-channel basis.

Waveform 117 may thus be used for peak reduction or cancellation, namely PAPR reduction, in delayed composite signal 101D to produce a composite signal 102 with reduced peaks. Along those lines, to output composite signal 102 from signal combiner 105, which may be a summation junction, summer or subtractor, waveforms 101D and 117 may be synchronously input to signal combiner 105 to subtract waveform 117 from delayed composite signal 101D on a channel band-by-channel band basis respectively for carriers 106 thereof.

Accordingly, it should be appreciated that a reordering operation of heterodyning and filtering with polyphase filtering as described herein means that multipliers for channelizing and dechannelizing may be avoided. This may amount to approximately a log-base-2 advantage in a reduction in resources in comparison to such conventional multiplier usage. As the number of carriers increases for wider bands, for conventional multiplier usage such cost linearly may increase, but with a polyphase transforming as described herein such increased cost may be controlled as log-base-2.

Furthermore, polyphase and/or channel filtering as described herein may be used for wideband wave forms with multiple carriers of same or different communication protocols and/or channel bandwidths A polyphase transform as described herein is capable of dealing with multi-channel signals, or more particularly multi-frequency division multiplexed signals.

Accordingly, PAPR may be reduced in delayed composite signal 101D while limiting introduction of the amount of in-band distortion, sometimes referred to error vector magnitude, and limiting introduction of the amount of out-of-band ("OOB") distortion in a controlled manner. This controlled manner may be different for different communication protocols, such as for example an LTE specification and WCDMA specification. Moreover, this controlled manner may be different for different carriers of the same communication protocol. However, as described herein, polyphase transforming, as well as inverse polyphase transforming, may be performed on a channel-by-channel basis. As channels may be specific to carriers, the amount of distortion allowed to be added to reduce PAPR for a communication protocol and/or carrier specific limit may be tailored using the above-described channelization.

Figure 5:
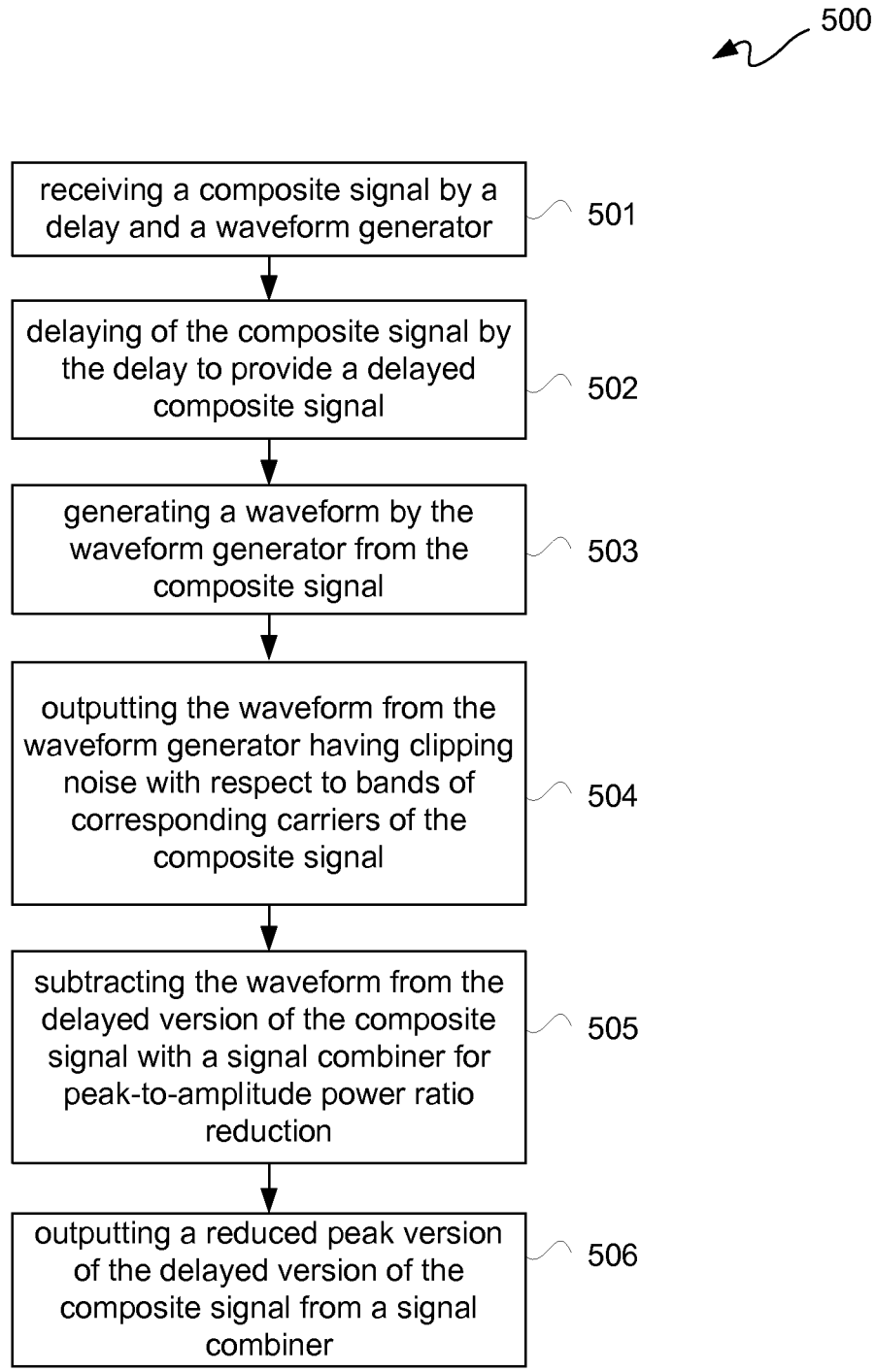
FIG. 5 is a flow diagram depicting an exemplary data communication flow.

FIG. 5 is a flow diagram depicting an exemplary data communication flow 500. At 501, a composite signal 101 may be received by a delay 103 and a waveform generator 104. At 502, a delayed version of composite signal 101, namely delayed composite signal 101D, may be provided from delay 103. At 503, a PAPR cancelation or reduction waveform 117 may be generated by waveform generator 104 from composite signal 101. Again, waveform generator 104 may be configured for NS-CFR using polyphase transformation, as previously described.

At 504, such waveform 117 may be output from waveform generator 104, where such waveform 117 has clipping noise, as well as possibly limited in-band distortion and out-of-band distortion, with respect to bands of corresponding carriers 106 of composite signal 101D. At 505, waveform 117 may be subtracted with a signal combiner 105 from delayed composite signal 101D for PAPR reduction. At 506, a reduced peak version of composite signal 101D, namely a reduced PAPR version thereof, may be output from signal combiner 105 as composite signal 102.

Figure 6:
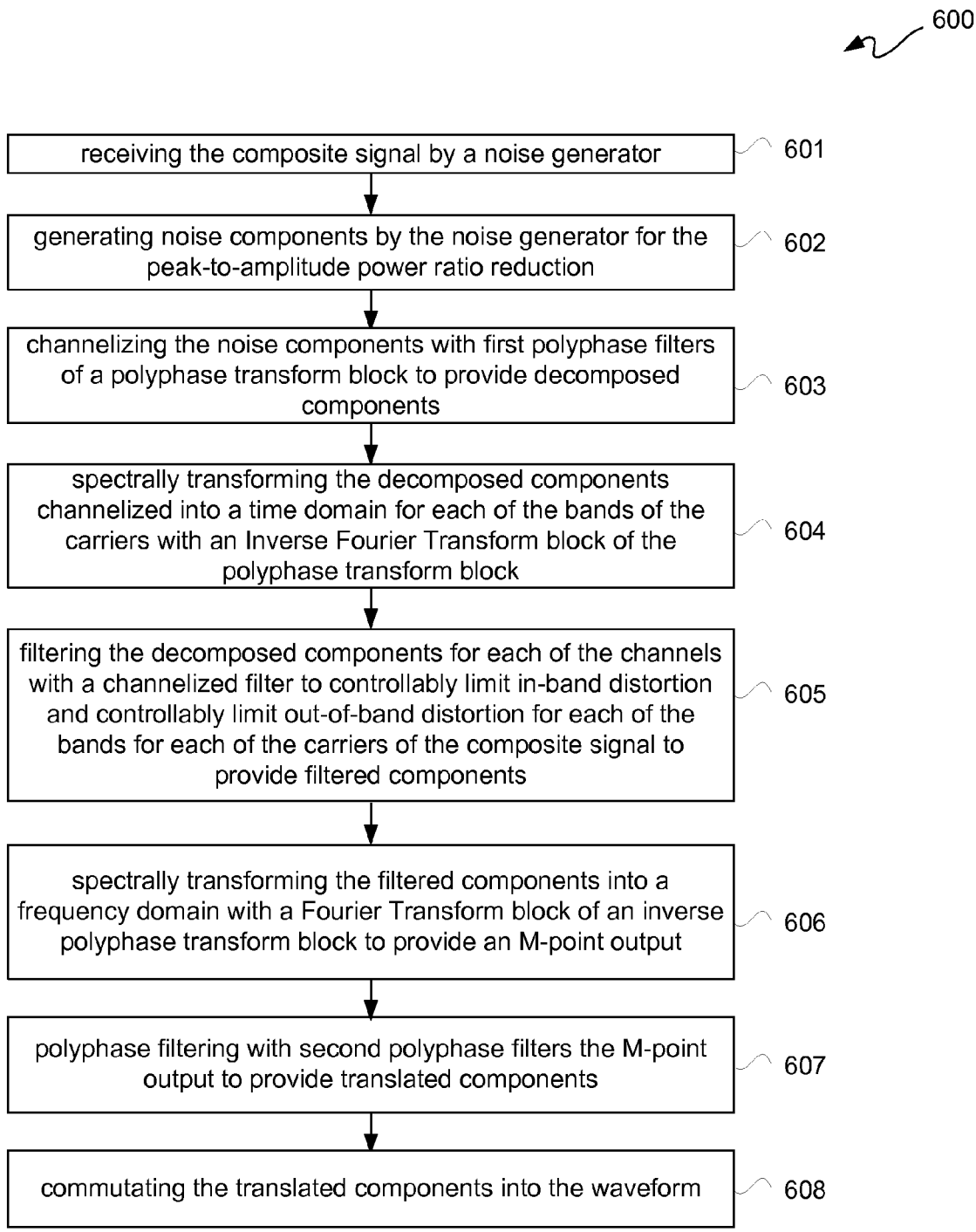
FIG. 6 is a flow diagram depicting an exemplary of a waveform generation flow.

FIG. 6 is a flow diagram depicting an exemplary of a waveform generation flow 600. Waveform generation flow 600 may be for waveform generator 104 for generation of waveform 117 from composite signal 101.

At 601, a composite signal 101 may be received by a threshold and clip block 110. At 602, noise components 111 for carriers 106 may be generated by threshold and clip block 110 for PAPR reduction. At 603, such noise components 111 may be channelized with first polyphase filters 202 of a polyphase transform block 112, namely polyphase filtering, to provide decomposed components 206.

At 604, decomposed components 206 may be spectrally transformed or converted into a time domain for each of the bands of carriers 106 with an Inverse Fourier Transform block 203 of polyphase transform block 112. At 605, noise components 206 for each of the channels may be filtered with a channelized filter 114 to controllably limit in-band distortion and controllably limit out-of-band distortion for each of the bands for each of carriers 106 of composite signal 101 to provide filtered components 115. This filtering to provide such control of in-band and out-of-band distortion may likewise filter out original spectral components of composite signal 101.

At 606, filtered components 115 may be spectrally transformed into a frequency domain with a Fourier Transform block 403 of an inverse polyphase transform block 116 to provide an M-point output 413 for M a positive integer greater than zero. At 607, such M-point output 413 may be polyphase filtered with second polyphase filters 402 to provide translated components 404. At 608, translated components 404 may be commutated into waveform 117.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 7:
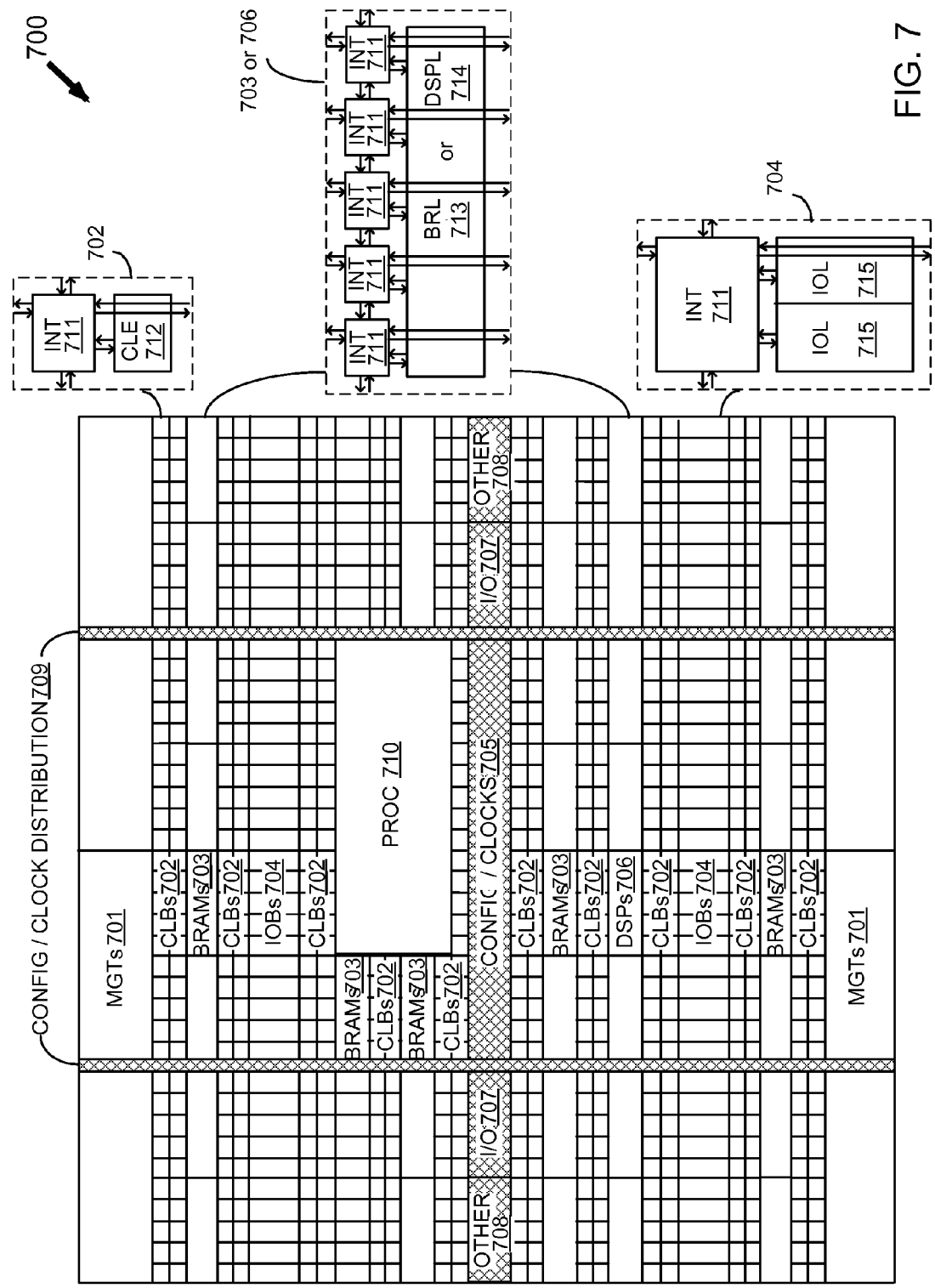
FIG. 7 is a simplified block diagram depicting an exemplary columnar Field Programmable Gate Array ("FPGA") architecture.

As noted above, advanced FPGAs can include several different types of programmable logic blocks in the array. For example, FIG. 7 illustrates an FPGA architecture 700 that includes a large number of different programmable tiles including multi-gigabit transceivers ("MGTs") 701, configurable logic blocks ("CLBs") 702, random access memory blocks ("BRAMs") 703, input/output blocks ("IOBs") 704, configuration and clocking logic ("CONFIG/CLOCKS") 705, digital signal processing blocks ("DSPs") 706, specialized input/output blocks ("I/O") 707 (e.g., configuration ports and clock ports), and other programmable logic 708 such as digital clock managers, analog-to-digital converters, system monitoring logic, and so forth. Some FPGAs also include dedicated processor blocks ("PROC") 710.

In some FPGAs, each programmable tile includes a programmable interconnect element ("INT") 711 having standardized connections to and from a corresponding interconnect element in each adjacent tile. Therefore, the programmable interconnect elements taken together implement the programmable interconnect structure for the illustrated FPGA. The programmable interconnect element 711 also includes the connections to and from the programmable logic element within the same tile, as shown by the examples included at the top of FIG. 7.

For example, a CLB 702 can include a configurable logic element ("CLE") 712 that can be programmed to implement user logic plus a single programmable interconnect element ("INT") 711. A BRAM 703 can include a BRAM logic element ("BRL") 713 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element ("DSPL") 714 in addition to an appropriate number of programmable interconnect elements. An IOB 704 can include, for example, two instances of an input/output logic element ("IOL") 715 in addition to one instance of the programmable interconnect element 711. As will be clear to those of skill in the art, the actual I/O pads connected, for example, to the I/O logic element 715 typically are not confined to the area of the input/output logic element 715.

In the pictured embodiment, a horizontal area near the center of the die (shown in FIG. 7) is used for configuration, clock, and other control logic. Vertical columns 709 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, processor block 710 spans several columns of CLBs and BRAMs.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 8:
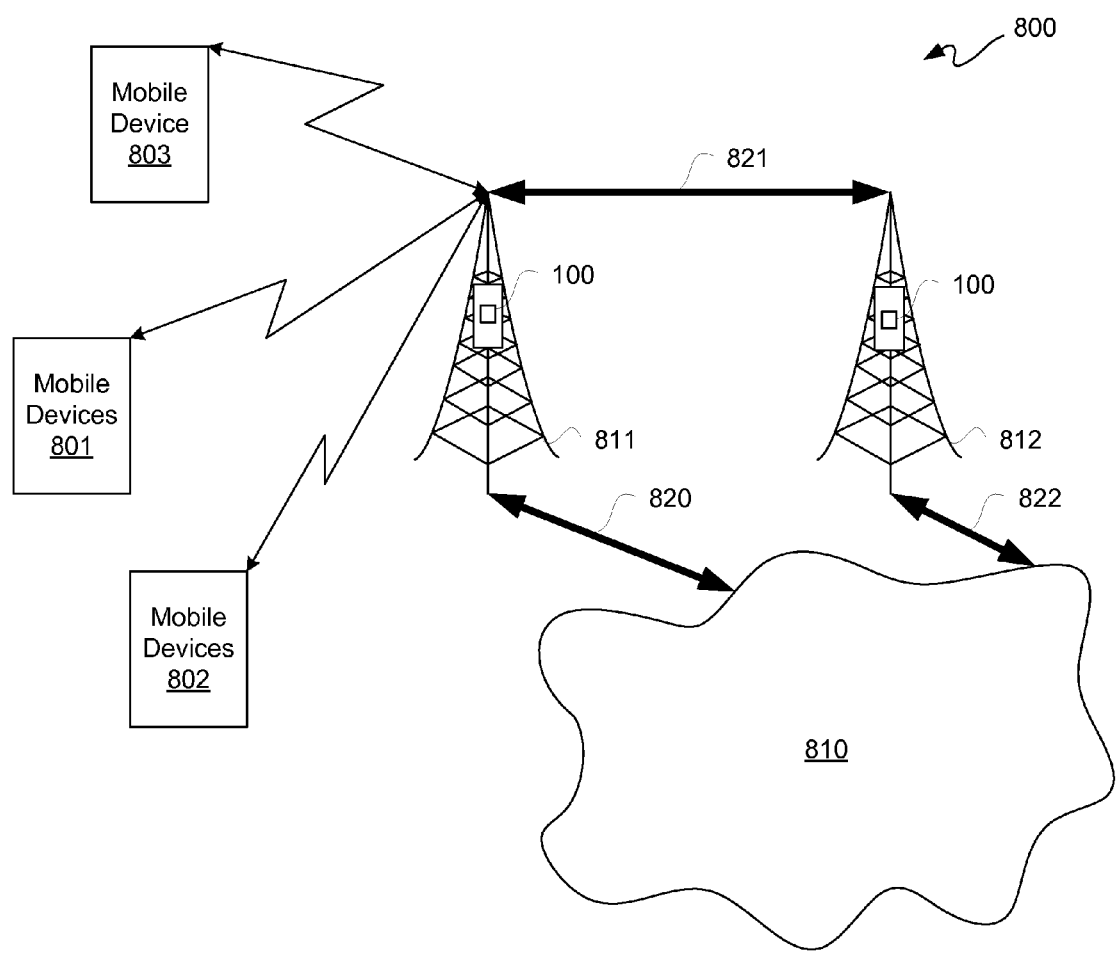
FIG. 8 is a network diagram depicting an exemplary a wireless network.

FIG. 8 is a network diagram depicting an exemplary a wireless network 800. Wireless network 800 may include base stations 811 and 812, as well as mobile devices 801, mobile devices 802, and mobile devices 803. Base stations 811 and 812 may be in communication with one another via a wireless backhaul 821, or base stations 811 and 812 may be in communication with one another via wired backhauls 820 and 822, respectively, and such wired backhauls 820 and 822 may be coupled to the Internet 810.

Mobile devices 801, mobile devices 802, and mobile devices 803 may communicate with base station 811 with a plurality of different communication protocols and/or different carrier bands, such as previously described. Accordingly, base station 811, as well as base station 812, may each be equipped with at least one PAPR device 100. PAPR device 100 may be used to reduce PAPR prior to signal transmission. Reducing PAPR prior to signal transmission means that such base stations 811 and 812 may use a less expensive (i.e., narrower bandwidth for linearity in transmission) and less power consuming radios for transmission of composite signal 102 for data communication. Additionally, as described herein, PAPR devices 100 may be configured to limit in-band distortion and out-of-band distortion differently for such different communication protocols and/or carriers to stay within specified limits thereof.

It should be understood that waveform generator 104 is a NS-CFR device which does not linearly scale in complexity with a number of channels N, but rather scales as log-base-2. This means less complexity, as well as less power consumption for base stations 811 and 812. Each of such base stations 811 and 812 may have multiple antennas for transmitting wideband signaling waveforms, such as OFDM, and thus such base stations 811 and 812 may employ channel multiplexing techniques such as OFDMA. By using channelization based on polyphase transforms, complexity for NS-CFR may be substantially reduced. For example, if an input waveform, such as composite signal 101, includes WCDMA or LTE, or a mixture thereof, carriers 106, a very efficient version of the conventional NS-CFR path that exploits multi-rate filters, symmetry in coefficient sets, and half-band filters, generally results in deployment of 56 physical multipliers, each of which may be operating at 368.64 MHz in this example. In comparison, a channelized NS-CFR device or waveform generator 104 as described herein may use only 22 multipliers to realize the same functionality as such conventional approach. Additionally, support of multiple antennas in a single device is not uncommon. If, for example, a single IC is to support 4 antennas or 8 antennas, then the number of multipliers for NS-CFR is multiplied by the number of antennas supported. In the above example, such a convention NS-CFR may use 4×56 or 8×56, respectively, multipliers on a single IC. This is to be contrasted with 4×22 or 8×22, respectively, multipliers for a same functionality using a channelizer NS-CFR device 104 as described herein.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for data communication, comprising:
   a delay coupled to receive a composite signal having multiple carriers to provide a delayed version of the composite signal;
   a waveform generator coupled to receive the composite signal to provide a waveform;
   wherein the waveform generator is coupled for noise-shaping crest factor reduction;
   a signal combiner coupled to the delay to receive the delayed version of the composite signal and coupled to the waveform generator to receive the waveform; and
   wherein the signal combiner is coupled to reduce at least one peak in the delayed version of the composite signal by application of the waveform to the delayed version of the composite signal for peak-to-average power ratio reduction thereof;
   wherein the waveform generator comprises:
      a threshold and clip block coupled to receive the composite signal to provide clipping noise with the composite signal;
      a polyphase transform block coupled to convert the clipping noise with the composite signal to first spectrally translated components channelized for channels corresponding to the multiple carriers;
      a filter block coupled to receive the first spectrally translated components to provide filtered components corresponding to the first spectrally translated components for removing therefrom original components of the composite signal, as well as some in-band and out-of-band distortion; and
      an inverse polyphase transform block coupled to receive the filtered components to provide second spectrally translated components for composition as the waveform.

2. The apparatus according to claim 1, wherein the polyphase transform block comprises:
   a commutator coupled to receive the clipping noise to channelize noise components of the clipping noise corresponding to the channels; and
   polyphase filters respectively coupled to receive the channelized noise components to provide decomposed components.

3. The apparatus according to claim 2, wherein the polyphase transform block further comprises an Inverse Fourier Transform block coupled to receive the decomposed components as an M-point frequency domain input to transform the decomposed components into an M-point time domain output to provide the first spectrally translated components.

4. The apparatus according to claim 1, wherein the filter block is a channelized filter.

5. The apparatus according to claim 4, wherein the channelized filter comprises at least one filter stage for each of the channels.

6. The apparatus according to claim 4, wherein the channelized filter comprises:
   a filter having at least one filter stage;
   an input commutator coupled to receive the first spectrally translated components to provide a single filter input to the filter to provide a single filter output; and
   an output commutator coupled to receive the single filter output from the filter to provide the filtered components respectively for the channels.

7. The apparatus according to claim 4, wherein the filter of the channelized filter comprises a bank of filters, wherein each filter of the bank of filters has a plurality of filter stages coupled in series.

8. The apparatus according to claim 1, wherein the inverse polyphase transform block comprises:
   a Fourier Transform block coupled to receive the filtered components as an M-point time domain input to transform the filtered components into an M-point frequency domain output as the second spectrally translated components;
   a polyphase filter bank having polyphase filters respectively coupled to receive the second spectrally translated components channelized for the channels; and
   an output commutator coupled to receive the second spectrally translated components to compose the waveform on a channel-by-channel basis for the channels for correspondence with the multiple carriers in the composite signal.

9. The apparatus according to claim 8, wherein:
the signal combiner is coupled to subtract the waveform from the delayed version of the composite signal to output a version of the composite signal with a reduced peak-to-average power ratio and with in-band distortion and out-of-band distortion; and
the filter block is to limit the in-band distortion and the out-of-band distortion.

10. The apparatus according to claim 9, wherein:
both the polyphase transform block and the inverse polyphase transform block are coupled to process multi-frequency division multiplexed signals; and
the composite signal and the waveform are digital signals in a frequency domain.

11. The apparatus according to claim 10, wherein M-points of the M-point time frequency domain output is not a power of two.

12. The apparatus according to claim 11, wherein M-points of the M-point frequency domain output is equal in number to a number of the channels.

13. The apparatus according to claim 9, wherein:
the waveform has a first amount of the in-band distortion and a first amount of the out-of-band distortion for the peak-to-average power ratio reduction of a first carrier of the multiple carriers;
the waveform has a second amount of the in-band distortion and a second amount of the out-of-band distortion for the peak-to-average power ratio reduction of the second carrier of the multiple carriers; and
the filter block is a channelized filter coupled to controllably limit the first amount of the in-band distortion, the first amount of the out-of-band distortion, the second amount of the in-band distortion, and the second amount of the out-of-band distortion differently for the first carrier than for the second carrier.

14. The apparatus according to claim 13, wherein the first carrier of the multiple carriers and the second carrier of the multiple carriers are for different carrier communication protocols.

15. The apparatus according to claim 14, wherein the carrier communication protocols are selected from a group consisting of LTE, WCDMA, and CDMA2000.

16. A system for data communication, comprising:
a multi-radio base station;
a plurality of mobile devices in communication with the base station;
wherein the plurality of mobile devices use a plurality of different communication protocols for the data communication;
wherein the multi-radio base station includes a peak-to-average power reduction device;
wherein the peak-to-average power reduction device comprises:
a delay coupled to receive a composite signal having multiple carriers for the plurality of different communication protocols to provide a delayed version of the composite signal;
a waveform generator coupled to receive the composite signal to provide a waveform;
wherein the waveform generator is coupled for noise-shaping crest factor reduction using polyphase transformation;
a signal combiner coupled to the delay to receive the delayed version of the composite signal and coupled to the waveform generator to receive the waveform; and
wherein the signal combiner is coupled to reduce at least one peak in the delayed version of the composite signal by application of the waveform to the delayed version of the composite signal for peak-to-average power ratio reduction thereof.

17. The system according to claim 16, wherein the waveform generator comprises:
a threshold and clip block coupled to receive the composite signal to provide clipping noise;
a polyphase transform block coupled to convert the clipping noise with the composite signal to first spectrally translated components channelized for channels corresponding to the multiple carriers;
a filter block coupled to receive the first spectrally translated components to provide filtered components corresponding to the first spectrally translated components; and
an inverse polyphase transform block coupled to receive the filtered components to provide second spectrally translated components for composition as the waveform.

18. The system according to claim 17, wherein:
the inverse polyphase transform block comprises:
a Fourier Transform block coupled to receive the filtered components as an M-point time domain input to transform the filtered components into an M-point frequency domain output as the second spectrally translated components;
a polyphase filter bank having polyphase filters respectively coupled to receive the second spectrally translated components channelized for the channels; and
an output commutator coupled to receive the second spectrally translated components to compose the waveform on a channel-by-channel basis for the channels for correspondence with the multiple carriers in the composite signal;
the signal combiner is coupled to subtract the waveform from the delayed version of the composite signal to output a version of the composite signal with a reduced peak-to-average power ratio and with reduced in-band distortion and out-of-band distortion for the data communication; and
the filter block is coupled to limit the in-band distortion and limit the out-of-band distortion differently for the plurality of different communication protocols.

19. A method for data communication, comprising:
receiving a composite signal by a delay and a waveform generator;
wherein the waveform generator is for noise-shaping crest factor reduction using polyphase transformation;
delaying of the composite signal by the delay to provide a delayed composite signal;
generating a waveform by the waveform generator from the composite signal;
outputting the waveform from the waveform generator having clipping noise with respect to bands of corresponding carriers of the composite signal;
subtracting the waveform from the delayed version of the composite signal with a signal combiner for peak-to-amplitude power ratio reduction; and
outputting a reduced peak version of the delayed version of the composite signal delayed from the signal combiner.

20. The method according to claim 19, wherein the generating of the waveform comprises:
receiving the composite signal by a threshold and clip block;

generating the clipping noise by the threshold and clip block for the peak-to-amplitude power ratio reduction;

channelizing noise components of the noise components with first polyphase filters of a polyphase transform block coupled to provide decomposed components;

spectrally transforming the decomposed components into a time domain for each of the bands of the carriers with an Inverse Fourier Transform block of the polyphase transform block;

filtering the decomposed components for each of the channels with a channelized filter coupled to controllably limit in-band distortion and controllably limit out-of-band distortion for each of the bands for each of the carriers of the composite signal to provide filtered components;

spectrally transforming the filtered components into a frequency domain with a Fourier Transform block of an inverse polyphase transform block to provide an M-point output for M a positive integer;

polyphase filtering of the M-point output with second polyphase filters to provide translated components; and commutating the translated components into the waveform.

* * * * *